United States Patent
Bell et al.

[11] Patent Number: 6,108,390
[45] Date of Patent: Aug. 22, 2000

[54] METHOD OF AND APPARATUS FOR ENCODING OF OUTPUT SYMBOL SIZE

[75] Inventors: Russell Bell; Saf Asghar, both of Austin, Tex.

[73] Assignee: Advanced Micro Devices, Inc., Sunnyvale, Calif.

[21] Appl. No.: 08/915,690

[22] Filed: Aug. 21, 1997

Related U.S. Application Data

[60] Provisional application No. 60/040,275, Mar. 7, 1997.

[51] Int. Cl.⁷ ..................................................... H04L 7/00
[52] U.S. Cl. ........................... 375/372; 370/233; 370/234
[58] Field of Search ..................................... 375/371, 372; 370/233, 234, 503, 412, 229, 413

[56] References Cited

U.S. PATENT DOCUMENTS

| | | | |
|---|---|---|---|
| 4,114,143 | 9/1978 | Karnaugh | 370/371 |
| 4,596,026 | 6/1986 | Cease et al. | 375/372 |
| 4,759,014 | 7/1988 | Decker et al. | 370/503 |
| 5,268,937 | 12/1993 | Marbot | 375/377 |
| 5,367,534 | 11/1994 | Chou et al. | 375/222 |
| 5,387,941 | 2/1995 | Montgomery et al. | 348/473 |
| 5,396,492 | 3/1995 | Lien | 370/412 |
| 5,469,432 | 11/1995 | Gat | 370/389 |
| 5,541,926 | 7/1996 | Saito et al. | 370/474 |
| 5,541,955 | 7/1996 | Jacobsmeyer | 375/222 |
| 5,553,048 | 9/1996 | Maeda | 369/60 |
| 5,565,924 | 10/1996 | Haskell et al. | 348/423 |
| 5,566,208 | 10/1996 | Balakrishnan | 375/240 |
| 5,590,374 | 12/1996 | Shariff et al. | 710/9 |
| 5,606,539 | 2/1997 | De Haan et al. | 369/59 |
| 5,666,168 | 9/1997 | Montgomery et al. | 348/473 |
| 5,801,779 | 9/1998 | Uz et al. | 348/420 |
| 5,872,823 | 2/1999 | Sutton | 375/372 |
| 5,999,654 | 12/1999 | Toujima et al. | 382/232 |
| 6,002,802 | 12/1999 | Chujoh et al. | 382/236 |
| 6,006,283 | 12/1999 | Hsieh et al. | 710/9 |
| 6,026,190 | 12/1999 | Astle | 382/232 |

*Primary Examiner*—Stephen Chin
*Assistant Examiner*—Lenny Jiang
*Attorney, Agent, or Firm*—Foley & Lardner

[57] ABSTRACT

A digital communication system includes a receiver and a transmitter in communication with the receiver over a communication link. The transmitter includes a buffer circuit which receives input data signals for transmission and a control signal. The buffer circuit outputs buffered data signals. A symbol encoder circuit receives the buffered data signals and provides the control signal. The symbol encoder circuit outputs data symbols over the communication link. The buffered data signals are supplied to the symbol encoder circuit in accordance with the control signal. The data symbols may be encoded with a number of data bits. The encoding may be done by voltage-level encoding.

11 Claims, 6 Drawing Sheets

DATA SYMBOL

SYMBOL CLOCK

DATA SYMBOL

SYMBOL CLOCK

| I1 | I2 | A | B | D/A OUT(V) |
|---|---|---|---|---|
| 0 | X | 0 | 0 | 0 |
| 0 | X | 0 | 0 | 0 |
| 1 | X | 1 | 1 | 4 |
| 1 | X | 1 | 1 | 4 |

| I1 | I2 | A | B | D/A OUT(V) |
|---|---|---|---|---|
| 0 | 0 | 0 | 0 | 0 |
| 0 | 1 | 0 | 1 | 1.33 |
| 1 | 0 | 1 | 0 | 2.66 |
| 1 | 1 | 1 | 1 | 4 |

METHOD OF AND APPARATUS FOR ENCODING OF OUTPUT SYMBOL SIZE

RELATED APPLICATIONS

This application claims priority to provisional application 60/040,275, filed Mar. 7, 1997.

BACKGROUND OF THE INVENTION

1. Field of the Invention

The invention relates to digital data communication systems. More particularly, the invention relates to a digital data communication system which transmits multiple bits per data symbol.

2. Related Art

Conventional digital communication systems use two levels of voltage or current to indicate the state of the transmission bit. The presence or absence of a voltage or a current represents a logical one or a logical zero. Typically, once a connection is established, data communication occurs at a fixed bit rate.

Conventional digital communications systems utilize a fixed size buffer. In such a system, data to be transmitted arrives at an input buffer. The data is clocked out of the input buffer at the fixed bit rate of the communication link until the buffer is empty. The rate of arrival of the data to the input buffer is a function of the application. However, a problem occurs if the data arrives more quickly than the data is clocked out because the input buffer becomes filled and may overflow, thereby resulting in a loss of data due to the overflow. Such a situation is referred to as a data bottleneck and typically is caused by applications which require intensive data throughput (also called "bursty communications"). Typically, a large buffer memory size is used to minimize data bottlenecks and thereby accommodate bursty communications. However, the cost of memory typically increases as the size of memory increases.

SUMMARY OF THE INVENTION

It is an object of the invention to overcome the above and other problems in conventional digital communication systems. Specifically, it is an object of the invention to provide a data communication system in which multiple bits are encoded in a single data symbol.

It is a further object of the invention to provide dynamic effective bit rates. In particular, it is an object of the invention to accommodate coexistent fixed and variable length data packets in a communication system that can dynamically adapt its data rate based on bandwidth needs or channel capacity.

It is a still further object of the invention to maintain compatibility with conventional digital communication systems.

The above and other objects of the invention are achieved by a digital communication system which utilizes multilevel data encoding to encode multiple bits per symbol. A digital communication system according to the invention includes a buffer circuit which receives input data signals for transmission and supplies buffered data signals to a symbol encoder circuit which thereafter outputs data symbols corresponding to the buffered data signals, wherein the buffered data signals are supplied to the symbol encoder circuit in accordance with a control signal supplied to the buffer circuit. The control signal may include a clock signal and may be supplied by the symbol encoder circuit in accordance with a buffer condition signal supplied from the buffer circuit to the symbol encoder circuit.

An apparatus for transmitting information according to the invention includes a digital-to-analog converter outputting symbols to be transmitted and a first-in-first-out (FIFO) memory having a clock input, a data input receiving data for transmission, and an output for supplying the data to an input of the digital-to-analog converter. A variable rate clock circuit responds to a threshold signal which is indicative of conditions in the FIFO memory to provide clock signals to the clock input at a rate in accordance with the conditions in the FIFO memory.

A digital communication system according to the invention may include a number of modes of operation. In a first mode of operation, the number of bits per symbol may be varied while maintaining a fixed symbol rate. In a second mode of operation, the output of the digital communication system is configured to be compatible with a target digital communication system. In a third mode of operation, both the symbol rate and the number of bits per symbol may be varied. In a fourth mode of operation, the effective data bit rate is reduced in response to a bit-error rate in excess of a pre-determined limit.

BRIEF DESCRIPTION OF THE DRAWINGS

These and other objects and advantages of the invention will be apparent from a review of the specification in light of the drawings, wherein:

FIGS. 7a and 7b show a logic table for data symbol encoding according to the invention.

DETAILED DESCRIPTION OF THE PREFERRED EMBODIMENTS

Figure 1:
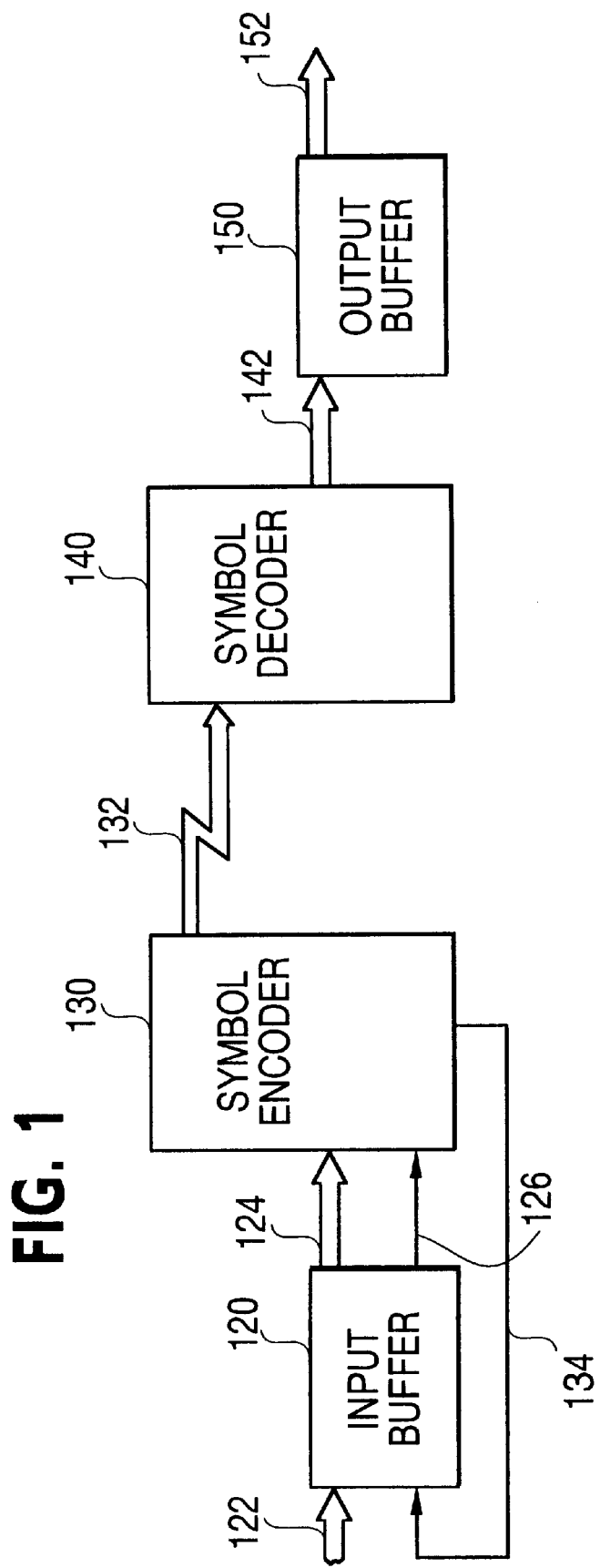
FIG. 1 is a block diagram of a digital communication system according to the invention.

FIG. 1 shows a block diagram of a digital communication system according to the invention. An input buffer circuit 120 receives an input data signal 122 and outputs data on a data line 124. A symbol encoder circuit 130 receives the data on the data line 124, encodes a data symbol, and outputs the data symbol over communication link 132. The input buffer circuit 120 also provides a condition signal 126 to the symbol encoder circuit 130. The symbol encoder circuit 130 provides a control signal 134 to the input buffer circuit 120. The control signal 134 may, for example, cause the input buffer circuit 120 to adjust the number of bits of data which are clocked out on the data line 124. In another example, the control signal 134 may cause the input buffer circuit 120 to increase a clock rate for outputting data bits from the input buffer circuit 120.

A symbol decoder circuit 140 receives the data symbol from the communication link 132, decodes the data symbol, and provides the decoded data as a data signal 142 to an output buffer 150. The output buffer 150 produces an output data signal 152.

The symbol encoder circuit 130 may provide a notification signal to the symbol decoder circuit 140 which notifies the symbol decoder circuit of the number of bits that are encoded per symbol. The notification signal may be detected based on the encoding employed by the symbol encoder circuit 130. For example, if, as hereinafter described, the symbol encoder circuit 130 utilizes multiple voltage levels to represent multiple data bits per data symbol, the symbol decoder circuit 140 may monitor the received voltage levels and detect the number of data bits present with A-to-D converters and corresponding logic circuits. In another example, a unique voltage level may correspond to the number of bits encoded per data symbol.

The notification signal may also be a separate signal or may be associated with the transmission method of the data symbol. For example, output signal frequency modulation, prior to transmission, for a data symbol encoded with one bit per data symbol may occur at carrier frequency $f_0$, while modulation of a data symbol encoded with multiple bits per data symbol may occur at carrier frequency $f_1$. The notification signal may correspond to detecting the shift in modulation from carrier frequency $f_0$ to $f_1$. Similarly, a change in phase or amplitude modulation may provide the notification signal for transmission of data symbols utilizing phase or amplitude modulation, respectively.

In another example, the symbol decoder circuit 140 may include multiple levels of receivers for different applications. For example, in a frequency modulated system, a first receiver may decode only one bit per symbol, at carrier frequency $f_0$, while a second receiver decodes multiple bits per symbol, at carrier frequency $f_1$. Both the first and second receivers connect to the same medium but neither would be able to "see" the signals sent to the other. In effect, the first and second receivers provide a form of channelization. An output buffer circuit synchronizes the received data symbols from both the first and second receivers.

Referring back to the transmitter side of the digital communication system shown in FIG. 1, the condition signal 126 is configured to be indicative of some condition of the input buffer circuit 120, such as providing an indication of an amount of data currently stored in the input buffer circuit 120. For example, the condition signal 126 may indicate that the input buffer circuit 120 is almost full or has filled beyond a predetermined threshold or limit. In response to condition signal 126 indicating such a condition, symbol encoder circuit 130 may, for example, generate an appropriate control signal 134 to increase the number of bits of data which are clocked out and thereby increase the effective bit rate at which data is clocked out of input buffer circuit 120 via data line 124.

Sometime thereafter, the condition signal 126 may indicate that the input buffer circuit 120 is empty or has emptied below a pre-determined threshold. In response to this condition, the symbol encoder circuit 130 may generate an appropriate control signal 134 to decrease the number of bits of data which are clocked out of input buffer circuit 120 via data line 124.

Figure 2:
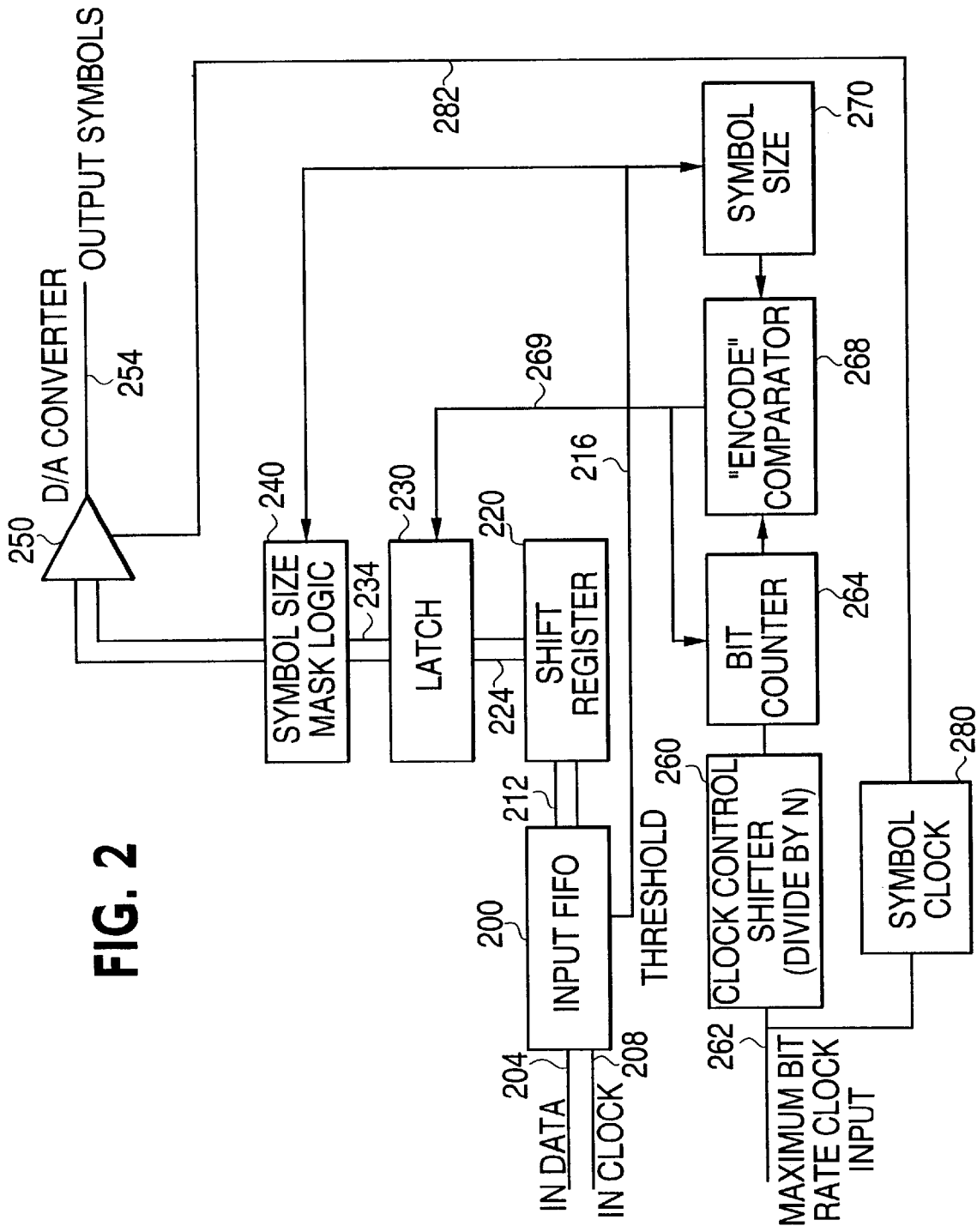
FIG. 2 is a block diagram of a first embodiment of a transmitter according to the invention.

FIG. 2 shows a detailed block diagram of a first embodiment of a transmitter according to the invention. Input FIFO 200 receives data via input data line 204 and it also receives input clock signal 208. Input FIFO 200 provides buffered data signal 212 to shift register 220. Input FIFO 200 also produces threshold signal 216 as described below.

Shift register 220 receives buffered data signal 212 and provides shifted data signal 224 to latch 230. Latch 230 latches shifted data signal 224 and provides latched data signal 234 to mask logic circuit 240. Mask logic circuit 240 produces a digital (i.e. binary) representation of a data symbol. Digital-to-analog (D/A) converter 250 receives the digital representation of the data symbol from the mask logic circuit 240 and outputs a voltage-level encoded data symbol to output line 254. The encoded data symbol is then sent over a communication link to a destination device.

A variable-rate clock circuit receives a maximum bit rate clock signal 262 as input to a clock control shifter 260. The output of the clock control shifter 260 is provided to a bit counter 264 which is bi-directionally coupled to an encode comparator 268 for comparison therewith. The threshold signal 216 from the input FIFO 200 is concurrently provided to symbol size logic circuit 270 and mask logic circuit 240. Symbol size logic circuit 270 provides a signal indicating a desired symbol size to encode comparator 268 in accordance with a condition indicated by threshold signal 216. Encode comparator 268 provides a control signal 269 to latch 230 indicating the number of data bits to latch per symbol.

The maximum bit rate clock signal 262 is provided to a symbol clock logic circuit 280 which outputs a symbol clock signal 282 at a desired symbol data rate to the D/A converter 250.

An exemplary operation of the first embodiment, shown in FIG. 2, is as follows. Data on input data line 204 arrives along with input clock signal 208 to the input FIFO 200. As the data moves out of the input FIFO 200, it is provided as a buffered data signal 212 to the shift register 220. At this point, the maximum bit rate clock signal 262 is driving clock control shifter 260, which may be, for example, a divide by N circuit with N set to its maximum value. The output of the clock control shifter circuit 260 is fed to a bit counter 264 which is compared with a desired symbol size stored by the encode comparator 268.

The data from the shift register 220 is latched on a per symbol basis in accordance with the control signal 269 provided by the encode comparator 268 to the latch 230. The output of the latch 230 is fed to the mask logic circuit 240 to prepare the digital representation of the data symbol as input for the D/A converter 250. Finally, the symbol clock signal 282 causes the D/A converter 250 to perform an appropriate conversion and the data symbol (an analog signal level) will be placed on the output line 254.

At sometime thereafter, the input FIFO 200 may begin to fill to the point at which an upper threshold is passed. The input FIFO 200 then triggers a threshold signal 216 which indicates this condition. The symbol size logic circuit 270 receives the threshold signal 216 and instructs the encode comparator 268 to encode more data bits per data symbol.

Concurrent with the preceding action, an output of the symbol size logic circuit 270 instructs the clock control shifter logic circuit 260 to lower N, thereby raising the frequency of a clock line that drives the shift register 220 and the input FIFO 200. Data will now be clocked out of the input FIFO 200 at a faster rate than in the previous situation in which the upper threshold had not been exceeded.

Figure 3A:
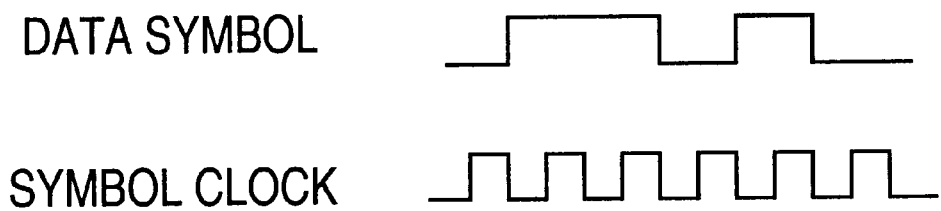
FIG. 3A is a timing diagram of a first mode of operation according to the invention.
Figure 3B:
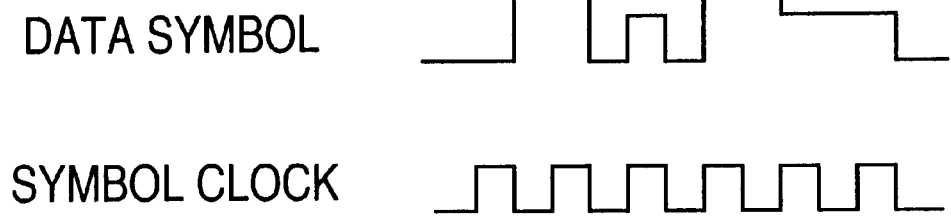
FIG. 3B is a timing diagram of a second mode of operation according to the invention.

FIGS. 3A and 3B show representative timing diagrams of the data symbols according to the invention outputted over the output line 254. In FIG. 3A, each transition of the symbol clock causes a corresponding data symbol to be outputted by the D/A converter 250 with each data symbol representing one data bit per data symbol. FIG. 3B shows the output of the D/A converter 250 following the occurrence of a threshold signal 216 indicating a condition requiring an increase in the number of data bits per symbol. In FIG. 3B, the symbol clock rate remains the same, but the output of the D/A converter 250 has been voltage-level encoded to represent multiple data bits per symbol.

Figure 4:
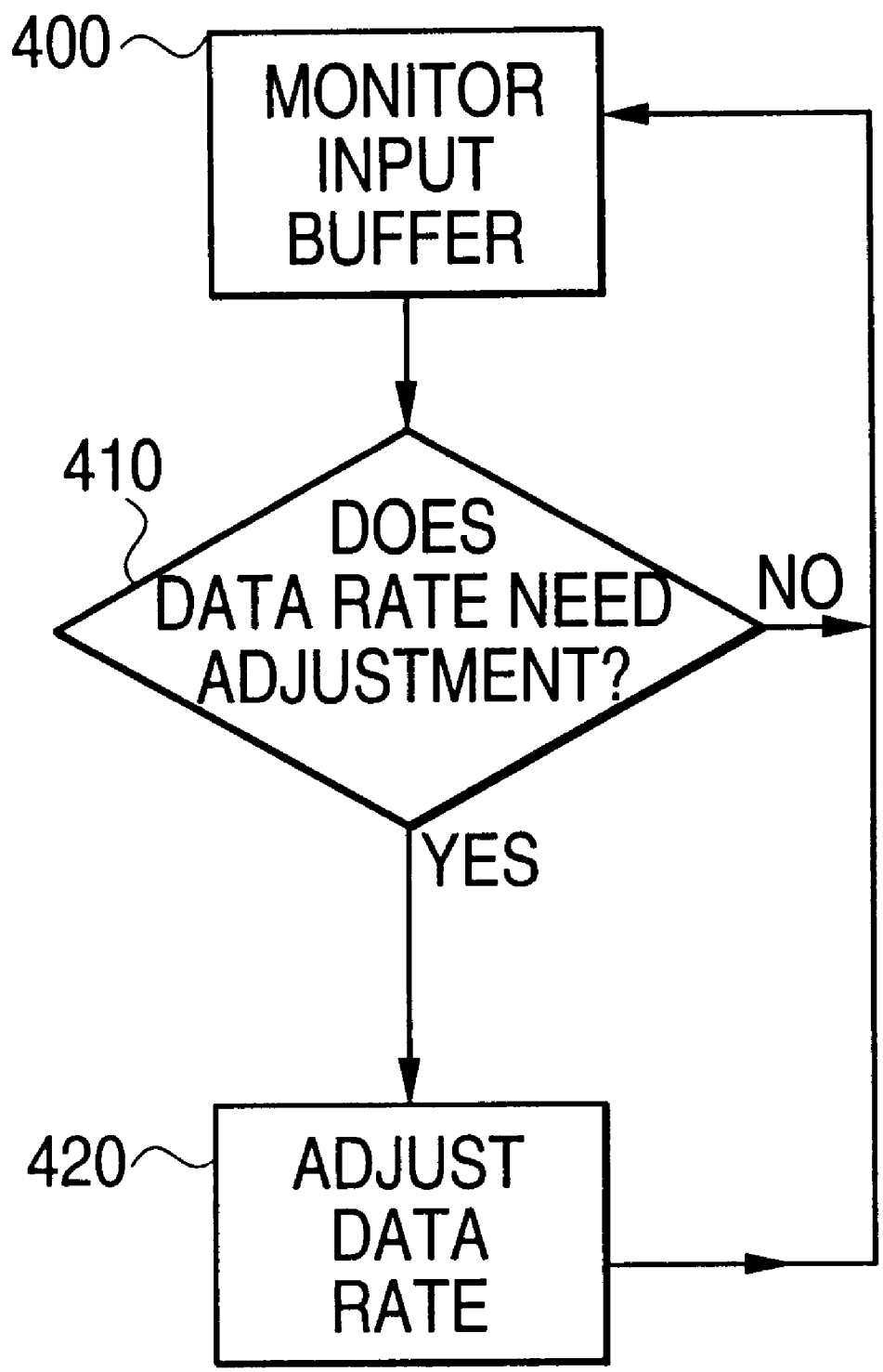
FIG. 4 is a flow diagram of a method according to the invention for adjusting the effective data bit rate.

FIG. 4 shows a flow diagram of a method of digital transmission according to the invention. In processing step 400, an input buffer is monitored for a pre-determined condition. In decision step 410, the method determines, in accordance with the results of step 400, whether a data rate needs to be adjusted. If no adjustment is necessary, processing returns to step 400. If decision step 410 determines that the data rate needs to be adjusted, processing step 420 adjusts the data rate and then processing returns to step 400.

In certain applications, a fixed symbol rate must be maintained. For example, the prevalent telephony architectures are synchronized to 8kHz frames for voice and data communication. The transmitter according to the present invention provides an advantage by enabling variable rates of communication while maintaining a fixed symbol rate. In other words, the transmitter according to the invention can dynamically adjust the bandwidth available over a communication link while maintaining compatibility with a fixed bandwidth communication system. This advantage is achieved, as described above with respect to specific embodiments, by adapting the output symbol to represent a different number of data bits, as needed.

The foregoing description relates only to a first mode of operation according to the invention which is directed to a digital communication system which requires a fixed symbol rate but in which both a transmitter and receiver according to the invention are present. In this situation, the system may operate as described above with respect to FIGS. 1 and 2 wherein a fixed symbol rate is maintained but the bandwidth can be dynamically adjusted by changing the number of bits per symbol. An additional advantage of this mode of operation is that the digital communication system can operate at the lowest internal clock speed when lightly loaded with an attendant reduction in power consumption. As demands for additional communication capacity are placed on this system, the symbol rate remains fixed, but the number of bits per symbol may be increased to minimize data bottlenecks and accommodate bursty communications.

Another advantage is provided by the digital transmitter according to the invention by maintaining compatibility with conventional modes of digital data communication. Thus, a second mode of operation for the digital transmitter shown in FIG. 2 includes configuring the transmitter to be compatible with a target communication system. For example, a conventional target system might utilize a fixed symbol rate (with one data bit per symbol) with particular voltage levels representing logical one and zeros, respectively. The digital transmitter according to the invention could be dynamically configured such that the data symbol rate would be adjusted to match the symbol rate of the target system and the output levels of the D/A converter 250 would be adjusted to match the particular target levels.

Another advantage of a digital transmitter according to the invention is provided by a third mode of operation wherein the data symbol rates are also varied. Even higher effective data bit rates can be achieved by increasing the data symbol rate in conjunction with adapting the output symbol to represent a different number of data bits, as needed.

A further advantage of the invention is to dynamically adjust the bandwidth to provide noise immunity. Encoding of the data symbol using multiple voltage levels to represent the increased number of bits per symbol required for higher speed communications may be susceptible to noise sources in the communication link. For example, noise may corrupt some of the signals that are present on the communications link and increase an aggregate bit error rate of the communications link. In a fourth mode of operation according to the invention, the digital communication system monitors the aggregate bit error rate of the communications link and decreases the number of data bits per symbol if the error rate exceeds a pre-determined limit. For example, the digital transmitter can simply revert to the full signal swing, rather than using discrete levels between minimums and maximums, and thereby providing some automatic noise immunity if the quality of the communication link degrades.

Figure 5:
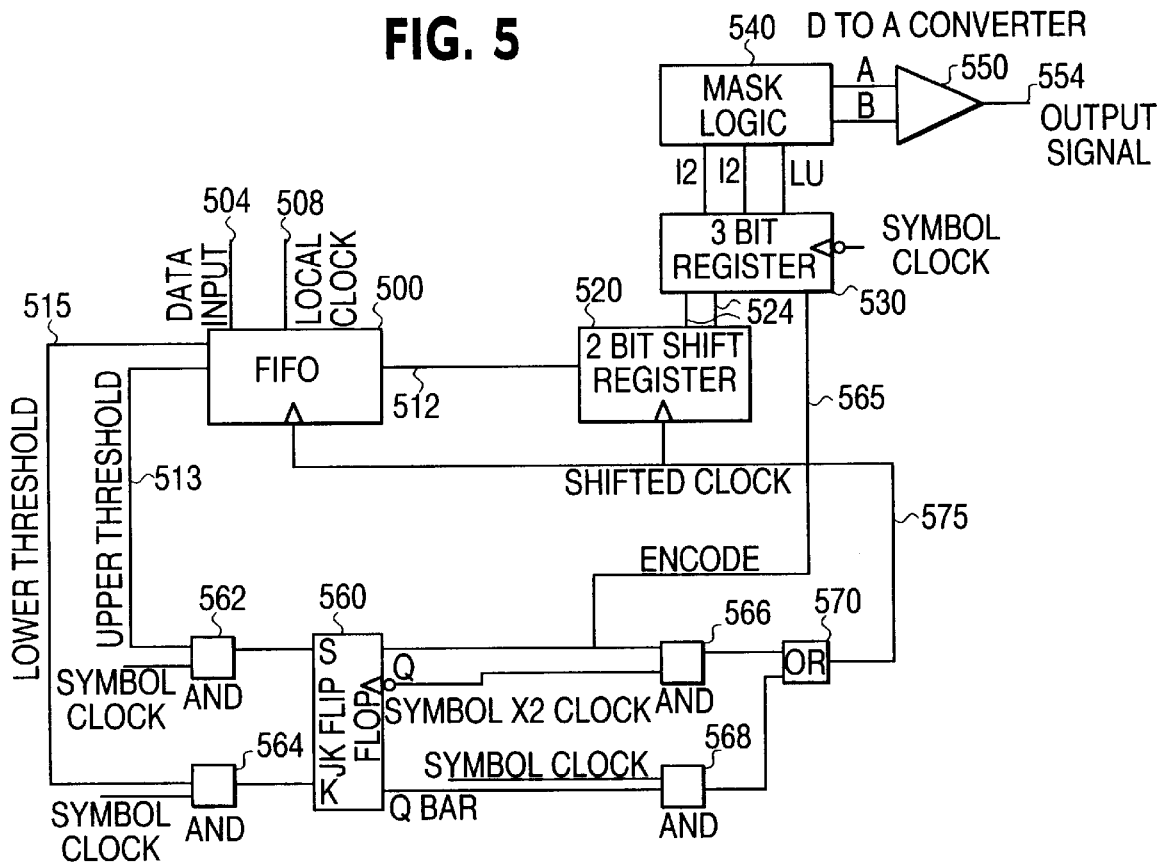
FIG. 5 is a block diagram of a second embodiment of a transmitter according to the invention.

FIG. 5 is a block diagram of a second embodiment of a transmitter according to the invention. FIFO 500 receives data via a data input line 504 and it also receives a local clock signal 508. FIFO 500 provides a buffered data signal 512 to a two-bit shift register 520. FIFO 500 also produces threshold signals UPPER THRESHOLD 513 and LOWER THRESHOLD 515, as described below.

Shift register 520 receives the buffered data signal 512 and provides shifted data signals 524 to a three-bit register 530. The register 530 also receives an ENCODE signal 565, hereinafter described, as an input. The register 530 latches the shifted data signals 524 and the ENCODE signal 565 and provides corresponding signals I1, I2, and LU, respectively, to a mask logic circuit 540, in accordance with a SYMBOL CLOCK. The mask logic circuit 540 produces signals A and B providing a binary representation of a data symbol. A digital-to-analog (D/A) converter 550 receives signals A and B from the mask logic circuit 540 and outputs a voltage-level encoded data symbol to output line 554. The encoded data symbol is then modulated and sent over a communication link to a destination device.

UPPER THRESHOLD signal 513 and LOWER THRESHOLD signal 515 are provided to one input of logical AND circuits 562 and 564, respectively. The other inputs of logical AND circuits 562 and 564 receive the SYMBOL CLOCK. The outputs of logical AND circuits 562 and 564 are respectively connected to J and K inputs of JK flip-flop 560. The Q output of JK flip-flop 560 provides the ENCODE signal 565. The JK flip-flop receives clock signal SYMBOLx2 CLOCK. The Q output of JK flip-flop 560 (ENCODE signal 565) and SYMBOLx2 CLOCK are provided as inputs to a logical AND circuit 566, while the Q-BAR output of JK flip-flop 560 and SYMBOL CLOCK are provided as inputs to a logical AND circuit 568. The outputs of the logical AND circuits 566 and 568 are provided as inputs to a logical OR circuit 570. The output of the logical OR circuit 570 provides a clock signal 575, denoted as SHIFTED CLOCK, which is connected to respective clock inputs on both the FIFO 500 and the shift register 520.

An exemplary operation of the second embodiment, shown in FIG. 5, is as follows. The FIFO 500 is filled by a data stream arriving on data input line 504 at a rate proportional to the local clock 508. The FIFO 500 provides signals UPPER THRESHOLD 513 and LOWER THRESHOLD 515 to control the flow of data into and out of FIFO 500. FIFO 500 may provide programmable limits for these two signals. For example, the UPPER THRESHOLD signal 513 may be initially set to a logical zero. If FIFO 500 provides a capacity of 1 kilo-bits, FIFO 500 may be programmed to set the UPPER THRESHOLD signal 513 to a logical one when 750 of the 1000 bits have been received by the FIFO 500 but have not yet been clocked out of the FIFO 500. As data is clocked out of the FIFO 500, the UPPER THRESH- OLD signal 513 will return to logic zero when the number of data bits remaining inside the FIFO has dropped below 750.

Similarly, the LOWER THRESHOLD signal 515 may transition based on a programmable number. For example, the LOWER THRESHOLD signal 515 may be initially set to a logical one. The FIFO 500 may be programmed to set the LOWER THRESHOLD signal to a logical zero when 100 bits have been clocked into the FIFO 500 but have not yet been clocked out of the FIFO 500. As data is clocked out of the FIFO 500, the LOWER THRESHOLD signal 515 will return to logic one when the number of data bits remaining inside the FIFO has dropped below 100.

Both the FIFO 500 and the shift register 520 are clocked by SHIFTED CLOCK (clock signal 575). Normally, when input and output data rates are nearly equal, SHIFTED CLOCK will be substantially identical to the SYMBOL CLOCK. However, when the input data rate exceeds the SHIFTED CLOCK rate, it may become necessary to encode more than one bit per symbol in order to clock bits out of the FIFO 550 at a faster rate. This is accomplished by "shifting" the clock signal that connects to the FIFO 500 and the shift register 520 to a higher frequency (in this case two times (2×) the frequency of SYMBOL CLOCK). According to the invention, SHIFTED CLOCK changes its operating shape (and frequency) when the programmed upper threshold is reached. This condition signifies to the transmitter according to the invention that the input data rate is exceeding the output data rate and the number of bits per symbol must be increased.

Figure 6:
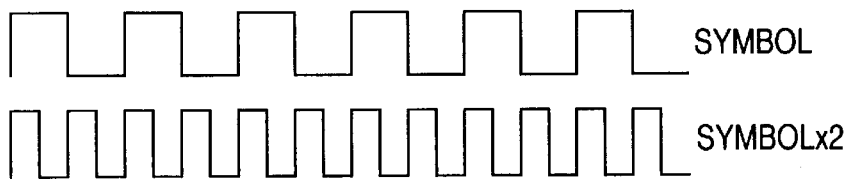
FIG. 6 is a timing diagram showing the relationship between two clock signals in the second embodiment.

FIG. 6 shows the relative relationship between the clock SYMBOL CLOCK and SYMBOLx2 CLOCK. SYMBOL CLOCK is related to the transmission clock rate and is not necessarily related to the local clock signal 508 in either frequency or phase. SYMBOL CLOCK and SYMBOLx2 CLOCK may be derived from the data rate of the bits that are received from the other end of the communications link. Moreover, SYMBOLx2 CLOCK may be derived from SYMBOL CLOCK via, for example, logic or phase locked loops.

When the UPPER THRESHOLD signal 513 is set to a logical one, it is ANDed by logical AND circuit 562 with SYMBOL CLOCK to assure that the J input on the JK flip flop 560 can only go high during the high portion of SYMBOL CLOCK. Similarly, the LOWER THRESHOLD signal 515 is ANDed with SYMBOL CLOCK by the logical AND circuit 564. This synchronization assures that SHIFTED CLOCK remains consistent independent of when the UPPER THRESHOLD and LOWER THRESHOLD signals 513, 515 transition.

After the UPPER THRESHOLD signal 513 goes high, the Q output of the JK flip-flop 560 (the ENCODE signal 565) goes high. The ENCODE signal 565 is provided to the logical AND circuit 566, thereby providing the SYMBOLx2 CLOCK to the input of the logical OR circuit 570. Thereafter, SHIFTED CLOCK assumes the operating characteristics of SYMBOLx2 CLOCK, namely, operating at twice the frequency of SYMBOL CLOCK. Data is then clocked out of the FIFO 500 and into the shift register 520 at a frequency that is twice the "normal" rate.

Concurrent with this shift in operating frequency, it is necessary to encode two bits into one data symbol per SYMBOL CLOCK period. Register 530 is driven by SYMBOL CLOCK and does not change operating characteristics. However, the ENCODE signal 565 is provided as an input to the register 530 and is passed to the mask logic circuit 540 as signal LU to cause the mask logic circuit to encode two bits per data symbol.

FIGS. 7a and 7b depicts an exemplary truth tables implemented by the mask logic circuit 540. As shown in FIGS. 7a and 7b, signals I1 and I2 from register 530 drive the D to A converter 550 to produce output voltage levels that are different than the output voltage levels that are produced when LU is a logical zero as opposed to when LU is a logical one.

When LU=0, the D to A converter 550 only produces two output voltage levels, regardless of the condition of signal I2. When LU=0, the circuit is encoding one bit per symbol and I1 is the only bit that influences the output of the D to A converter 550.

When LU=1, the D-to-A converter produces one of four output voltage levels. These four output voltages represent the encoding of two bits of information from signals I1 and I2. When LU=1, both I1 and I2 influence the output of the D to A converter 550.

When the contents of the FIFO 500 have been sufficiently removed and the signal LOWER THRESHOLD is set to logical one, the output of the logical AND circuit 564 will go high in conjunction with the SYMBOL CLOCK. On the falling edge of SYMBOLx2 CLOCK, the JK flip-flop 560 will return to a LOW state wherein the Q-BAR output will go high and SYMBOL CLOCK (the lower operating frequency) is provided, through the logical AND circuit 568 and the logical OR circuit 570, as SHIFTED CLOCK (clock signal 575).

As hereinbefore described, SHIFTED CLOCK operates at a first operating frequency, corresponding to SYMBOL CLOCK, until an upper threshold is reached, at which point SHIFTED CLOCK operates at a second operating frequency, corresponding to SYMBOLx2 CLOCK, until a lower threshold is reached, at which point SHIFTED CLOCK reverts to the first operating frequency. This process continues to oscillate back and forth as required for transmission of the data stream and as indicated by the lower and upper threshold signals.

While the second embodiment has been described with respect to two (2) bit per data symbol encoding, one skilled in the art will appreciate the second embodiment is illustrative only and that three or more bits per data symbol may be readily provided with appropriate logic. Moreover, while the second embodiment has been described with respect to encoding multiple bits per data symbol by encoding the output voltage level using a D to A converter, the invention is similarly applicable to encoding multiple bits per data symbol by encoding, for example, phase, frequency, or position.

Other embodiments of the invention will be apparent to those skilled in the art from consideration of the specification and practice of the invention disclosed herein. It is intended that the specification be considered as exemplary only, with the true scope and spirit of the invention being indicated by the following claims.

What is claimed is:

1. A digital communication system comprising:
   a receiver; and
   a transmitter in communication with said receiver over a communication link, said transmitter comprising:
   a buffer circuit receiving input data signals for transmission and a control signal and outputting buffered data signals, and
   a symbol encoder circuit receiving said buffered data signals, providing said control signal, and outputting data symbols on said communication link, said data symbols corresponding to said buffered data signals, wherein said buffered data signals are supplied to said symbol encoder circuit in accordance with said control signal and are not based on data provided by said receiver over said communication link.

2. The digital communication system as recited in claim 1, wherein each one of said data symbols comprises a plurality of data bits.

3. The digital communication system as recited in claim 2, wherein said each one of said data symbols is voltage-level encoded to represent said plurality of data bits.

4. The digital communication system as recited in claim 2, wherein an output rate of said data symbols is maintained at a pre-determined rate.

5. The digital communication system as recited in claim 1, wherein said buffer circuit provides a condition indicating signal to said symbol encoder circuit.

6. A digital communication system comprising:
a receiver; and
a transmitter in communication with said receiver over a communication link, said transmitter comprising:
a buffer circuit receiving input data signals for transmission and a control signal and outputting buffered data signals, and
a symbol encoder circuit receiving said buffered data signals, providing said control signal, and outputting data symbols on said communication link, said data symbols corresponding to said buffered data signals,
wherein said buffered data signals are supplied to said symbol encoder circuit in accordance with said control signal,
wherein said buffer circuit provides a condition indicating signal to said symbol encoder circuit,
wherein said symbol encoder circuit provides said control signal in accordance with said condition indicating signal, and
wherein said condition indicating signal provides an indication of an amount of data currently stored in said buffer circuit.

7. The digital communication system as recited in claim 6, wherein said control signal comprises a clock signal for clocking said buffered data signals out of said buffer circuit.

8. The digital communication system as recited in claim 6, wherein said control signal indicates a number of data bits to be outputted by said buffer circuit for each one of said buffered data signals.

9. An apparatus for transmitting information comprising:
an input buffer receiving input data for transmission and providing buffered data corresponding to said input data, said input buffer also providing a condition indicating signal indicative of a condition of said input buffer;
a shift register receiving said buffered data and providing shifted data;
a latch receiving said shifted data and a latch control signal and providing latched data corresponding to said shifted data and in accordance with said latch control signal;
a mask logic circuit receiving said latched data and said condition indicating signal and providing digital representations of data symbols in accordance with said latched data and said condition indicating signal;
a digital-to-analog converter receiving said digital representations of said data symbols and a symbol clock signal and outputting said data symbols at a rate corresponding to said symbol clock signal;
a variable-rate clock circuit including:
a symbol size logic circuit responsive to said condition indicating signal to determine a desired symbol size and providing a symbol size control signal in accordance with said desired symbol size,
a clock control shifter receiving a maximum bit rate clock signal and providing a shifted clock signal derived from said maximum bit rate clock signal in accordance with a shifted clock adjusting signal,
a bit counter receiving said shifted clock signal and providing a bit count signal, and
an encode comparator receiving said symbol size control signal and said bit count signal and providing said shifted clock adjusting signal, said encode comparator also providing said latch control signal to said latch; and
a symbol clock logic circuit receiving said maximum bit rate clock signal and providing said symbol clock signal to said digital-to-analog converter.

10. The apparatus as recited in claim 9, wherein said clock control shifter comprises a divide-by-N circuit.

11. A method of digital communication comprising the steps of:
(A) providing an input buffer for buffering input data signals for transmission, said input buffer providing the input data signals to an encoder for encoding the input data signals;
(B) monitoring an amount of data in said input buffer;
(C) determining if an effective data rate of transmission requires adjustment; and
(D) adjusting said data rate if said step (C) determines that said data rate requires adjustment.

* * * * *